United States Patent Office 3,362,806
Patented Jan. 9, 1968

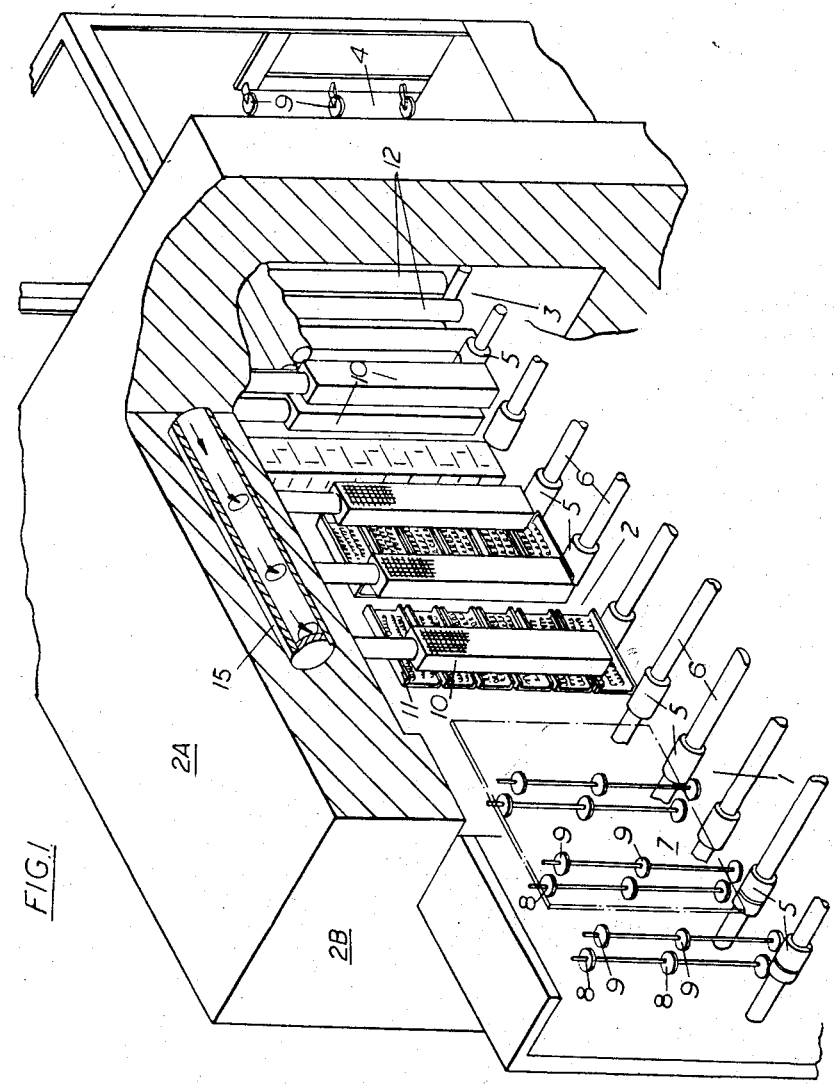

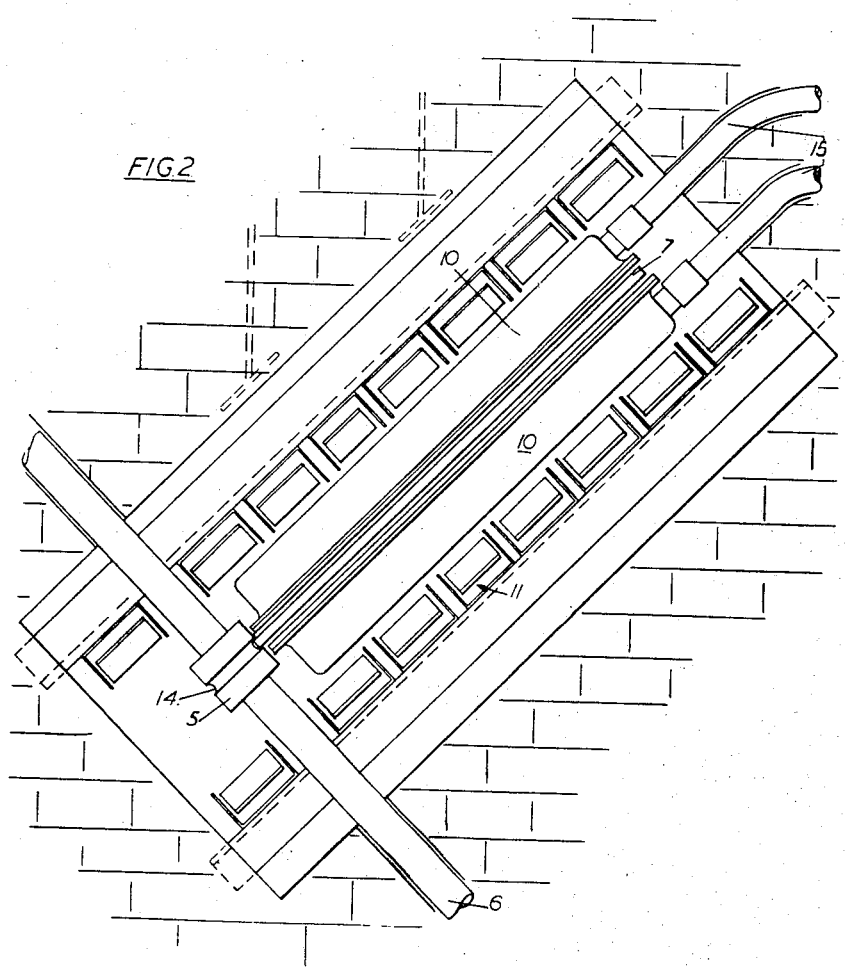

3,362,806
METHODS OF HEAT TREATING AND GAS PRESSURE SUPPORTING GLASS IN SHEET FORM
John Dennis Brewin and Hubert Cecil Wynne, St. Helens, England, assignors to Pilkington Brothers Limited, Liverpool, England, a corporation of Great Britain
Filed Dec. 20, 1963, Ser. No. 332,071
Claims priority, application Great Britain, Dec. 28, 1962, 48,958/62
6 Claims. (Cl. 65—114)

This invention relates to methods of treating glass in sheet form, for example in tempering a series of sheets of glass.

Methods of treating glass in sheet form are known in which the glass sheet is suspended vertically from a conveyor by means of tongs engaging opposite sides of the glass sheet, and the suspended glass sheet is introduced into a furnace in which the glass sheet is heated, for example to a temperature above the strain point of the glass.

Sheets of glass which have been treated in the process in which they are suspended by tongs during heating inevitably have marks on their surfaces where they are gripped by the tongs, so that the quality of the surface of the glass sheet is impaired at these points. Similarly, if a glass sheet is supported in a mould during a heating process, the surface of the glass in contact with the mould is likely to be marked by the mould.

In United Kingdom patent specification No. 224,713 (Pilkington Brothers Limited of St. Helens, Lancashire, England) there is disclosed a method of supporting glass in sheet form in a desired plane of travel (e.g. either horizontal or vertical) by creating in a bed across which the glass is travelling a multitude of air flows of short duration by constituting the bed with air inlets closely associated with air outlets, the air delivered being under sufficient pressure to support the glass in close but spaced relation with the bed whereby the glass is supported on an air cushion created by individual flows of air at a uniform pressure, each relative flow being very small in relation to the area of glass being supported. In the aforesaid specification reference is made to the use of a bed extending as a unit under the path of travel of the glass or a bed made up of a plurality of relatively small units each unit comprising air inlets and adjacent outlets.

The main object of the present invention is to provide an improved method and apparatus for pneumatically supporting heated glass in sheet form during edgewise travel along a predetermined path.

An object of the present invention is to provide a method of treating glass in sheet form wherein the glass is heated and in which the presence of tong or mould marks in the surface of the glass sheet is avoided.

The present invention provides a method of treating glass in sheet form at an elevated temperature wherein the glass is supported edgewise and is maintained pneumatically in a predetermined plane intersecting the plane of the support during the said treatment.

More particularly the present invention provides a method of treating glass in sheet form at an elevated temperature wherein the glass is supported edgewise on a conveyor and is balanced pneumatically on the conveyor as it is advanced by the conveyor and during the said treatment.

The conveyor on which the sheet of glass is advanced may be a member which is itself advanced with the sheet of glass, for example a belt or a supporting carrier which is moved by engagement with a series of rollers, or, alternatively, the conveyor may be a series of rollers which engage the lower edge of the glass sheet directly.

The heating step to which the sheet of glass is subjected may be the first step in a tempering process. In the conventional tempering process, the sheet of glass is suspended from a conveyor by tongs as already mentioned and is first introduced into a furnace where the sheet is heated to a temperature above the strain point of the glass. The heated glass sheet is then positioned between opposed quenching frames which deliver a chilling medium against the surfaces of the glass sheet, the chilling medium chills the surfaces of the glass, introducing a temperature-difference between the central portion and the surfaces of the glass sheet, which temperature-difference is maintained until the whole glass sheet has been cooled to a temperature below the strain point of the glass, when the temperature conveniently is allowed to even out through the glass sheet, and a sheet of tempered glass is obtained.

Glass sheets tempered by this conventional process inevitably have tong or mould marks in the surfaces, which are a source of weakness and optical distortion in the tempered glass sheets.

According to the present invention, therefore, there is provided a method of tempering a series of sheets of glass wherein the individual sheets are advanced by a conveyor, with the lower edges only of each sheet supported by the conveyor, through the heating and quenching zones.

The heating in the heating zone is effected most economically if the cushion of gas under pressure and in contact with the surface of the glass sheet in the heating zone is continuously supplied with streams of heated air, carbon dioxide or other gas, preferably at a temperature of the order of the temperature to which the glass sheets are to be raised.

The sheets of glass on the conveyor generally speaking are maintained in a vertical plane. However, for very large sheets of glass to be tempered by a method according to the invention, it is preferred that the sheets of glass be maintained in an inclined plane, for example in a plane at an angle of more than 10° to the horizontal. In this way not all the weight of the glass sheet rest on the conveyor, but some of the weight is supported by the cushions of gas under pressure so that any possibility of buckling or distorting of a heated glass sheet under its own weight is avoided.

The present invention also comprehends a tempered sheet of glass produced according to the method of the invention.

In order that the invention may be more clearly understood preferred embodiments thereof will now be described, by way of example, with reference to the accompanying diagrammatic drawings in which:

FIGURE 1 is a perspective view partly cut away of apparatus for tempering a glass sheet by a method according to the present invention, and FIGURE 2 is a section through a modified form of the apparatus of FIGURE 1 in which the glass sheet is moved through the apparatus at an angle to the vertical.

In the drawings, like reference numerals designate the same or similar parts.

Referring first to FIGURE 1 of the drawings, there is shown apparatus for tempering glass in sheet form in which a series of sheets of glass is conveyed through the apparatus. The apparatus comprises a loading section indicated generally by the reference numeral 1, a heating zone indicated generally by the reference numeral 2, a quenching zone 3 and a take-off section 4. A series of rollers 5, each mounted on a driving shaft 6, acts as a conveyor for conveying a glass sheet such as the sheet 7 through the apparatus. The sheet 7 is placed on the rollers 5 and is maintained in a vertical position by the two series of rotating discs 8 and 9.

The heating zone of the apparatus is housed in a tunnel comprising a roof 2A and side walls 2B.

A continuous operation of the apparatus is preferred so that the rollers 5 continuously rotate to advance the glass sheet 7 from the loading section 1 into the heating zone 2 wherein the glass is balanced vertically by mobile layers of gas under pressure, forming gas cushions which are maintained by streams of gas from gas boxes 10 into the cushions. The gas used is conveniently air or carbon dioxide. For sake of clarity only one series of gas boxes 10 is shown which will direct gas streams towards one surface of each glass sheet to provide a mobile layer of gas under pressure in contact with one surface of the glass sheet and constituting a cushion of gas in contact with that surface. A similar series of gas boxes (not shown) will also be provided to direct gas streams into cushions on the opposite surface of the glass sheet. The glass sheet will thus be balanced in a vertical position and maintained in that vertical position during its passage through the heating zone by the cushions of gas which are continuously supplied with gas by gas streams from the gas boxes 10 and the only contact of the glass sheet with a solid surface in the heating zone is the contact between the lower edge of the glass sheet and the rollers 5 engaging that edge and supporting the glass sheet.

The cushions of gas under pressure which balance the glass sheet in the vertical position in the heating zone 2 are maintained by streams of gas, for example air or carbon dioxide at a temperature in the range of 600° to 800° C., to assist in bringing the glass to a temperature above its strain point. Heat is also supplied to the glass also by the electric heating elements 11 which are positioned behind the narrow gas boxes 10 so that they direct heat through the gaps between the gas boxes on to the glass sheet as it progresses through the heating zone.

In addition to directing heat on to the glass sheet, the heating elements 11 mounted on the side walls 2B of the tunnel will heat up the surfaces of the gas boxes 10 which in the preferred embodiment are metal boxes each having a perforated face although other porous materials, for example ceramic materials, may be used for the face plate. As a result of this heating, the gas boxes 10 will also radiate heat on to the glass sheet passing between the respective pairs of them.

The gas is supplied to the gas boxes 10 through gas inlet pipes 15 at such a pressure that a pressure between 3 and 10 inches water gauge exists inside the gas boxes 10 and the clearance between the surface of the glass sheet and the surface of the gas boxes is conveniently of the order of 0.040 inch. With a gas pressure of between 3 and 10 inches water gauge in the gas boxes 10 and a suitable relationship between the perforations in the face plate and the total area of the face plates of the gas boxes 10, there will be a gas pressure between the faces of the gas boxes and the surfaces of the glass sheet of the order of ½ inch to 2 inches water gauge.

As the glass sheet is conveyed by the rollers 5 from the heating zone 2 into the quenching zone 3, it is balanced in the vertical position by cushions of cold gas at approximately 20° C. and maintained under pressure by streams from the gas boxes 10 in the quenching zone. In addition, there are provided in the quenching zone 3, quenching gas boxes 12 from which cold gas is directed between the gas boxes 10 on to the glass sheet supported vertically in the quenching zone 3. The clearance between the surfaces of the glass sheet and each gas box 10 in the quenching zone 3 is also of the order of 0.040 inch and the gas supplied to the gas boxes 10 in the quenching zone 3 is also such as to produce a pressure of the order of 3 to 10 inches water gauge inside these boxes. The cold gas directed from the quenching gas boxes 12 on to the glass sheet is also at a temperature of about 20° C. and is preferably at a pressure of the order of 5" water gauge or other suitable pressure according to the thickness of glass being tempered or the degree of tempering required.

From the quenching zone 3, the glass sheet is moved by the conveyor rolls 5 into the take-off section 4 of the apparatus where it is again maintained in the vertical position by rotating discs 8 and 9 similar to those employed in the loading section 1. The tempered glass sheet is then removed from the apparatus.

The arrangement of the heating and quenching zones and the speed at which the glass sheet 7 is conveyed through these zones are chosen so that a satisfactory tempering of the sheet is obtained. For example, it is found that when the heating zone is at a temperature of the order of 700° C., the heating period should last for 2–3 minutes and the glass sheet should then be in the quenching zone for one minute. In practice, the glass sheet will have been quenched sufficiently to become tempered after only 15 to 20 seconds and the remainder of the period in the quenching zone is used in order to cool the glass sheet sufficiently for it to be removed from the take-off section.

In the embodiment of the apparatus shown, the glass sheet is fed through the heating and quenching zones by the movement of the rollers 5. Equally, however, in order to avoid local overheating and consequent risk of breakage, the glass sheet may be placed on a conveyor member, for example a metal bar arranged to have a series of point contacts with the edge of the glass sheet and the metal bar carrying the glass sheet 7 be conveyed through the apparatus by the movement of the rollers 5.

Referring now to FIGURE 2, there is shown an alternative arrangement in which the rollers 5 and their shafts 6 are disposed at an angle of approximately 45° to the vertical. FIGURE 2 is a section through the heating zone of an inclined apparatus and it will be appreciated that the glass sheet 7 tends to move nearer to the gas boxes 10 under the lower surface of the glass sheet 7 so that a greater pressure is built up in the cushion of gas in contact with the lower face of the glass sheet 7 than is present in the cushion of gas in contact with the upper surface of the glass sheet, and the glass sheet is consequently supported in this inclined position. If desired, gas may be supplied from each lower gas box 10 at a higher pressure than gas from the upper boxes and the supporting of the glass sheet in the inclined position thereby assisted.

It will also be noted in FIGURE 2 that the lower edge of the glass sheet is engaged in a cut out portion 14 of the roller 5 so that the lower edge is maintained in the desired position, even though the glass sheet is at an angle of 45° to the vertical.

The arrangement of FIGURE 2 has particular application for large sheets of glass in order that any tendency of the glass sheet to buckle or deform as a result of its own weight may be eliminated.

By the use of the present invention, it is found that tempered glass free from surface blemishes of the types mentioned may be obtained. Also by providing gas boxes directing streams of gas to maintain cushions of gas at both surfaces of the glass sheet during both the heating and quenching steps of the process, even when the glass sheet is in an inclined position as in FIGURE 2, it is found that the toughening pattern in the glass sheet is substantially symmetrical through the thickness of the glass sheet.

Although the present invention has been described as applied to the heat treatment of flat sheets of glass, it will be appreciated that the process is not so limited. The process of the invention can be applied to bending glasses and in particular sheets of glass which are curved in one plane only may be treated by the method of the present invention, the gas boxes delivering the gas which supports such a curved sheet being shaped to have a contour similar to that of the glass sheet.

Instead of using a conveyor which moves continuously in one direction, it is possible to impart a reciprocating motion to the conveyor. The reciprocating motion may take place during the progress of the glass sheet through the heating and quenching zones to equalise the temperature over the surface areas of the glass sheet during the process, or it may be a return action of the conveyor at the end of the treatment of a sheet of glass.

What we claim is:

1. A method of heating glass in sheet form while supporting the lower edge of the sheet which comprises conveying glass sheets while supporting them as they are advanced in a plane intersecting the plane of the conveyor by supplying towards the surfaces of the sheets from narrow areas juxtaposed to said surfaces and spaced from each other in the direction of glass movement heated gas under sufficient pressure to support the sheet away from said areas, and continuously directing radiant heat at the glass where it is exposed between said areas, and permitting escape of gas through lower areas.

2. A method as in claim 1 wherein the gas is supplied towards the surfaces from positions substantially equidistant from the surfaces.

3. Apparatus for heating glass in sheet form comprising means to support a sheet of glass on a lower edge and to conduct it forwardly in its own plane, heating means disposed at at least one side of the sheet in spaced relation thereto and adapted to direct heat toward the sheet, and a plurality of boxes interposed between said heating means and the path of movement of said sheet and formed with perforations substantially throughout the surfaces of the boxes facing the path of the sheet, said boxes being spaced from each other and extending from near the lower edge to near the upper edge of the sheet, and means to introduce gas under pressure to the upper ends of said boxes.

4. Apparatus as in claim 3 wherein said perforations are throughout their vertical extent a substantially equal distance from the path of said sheet.

5. Apparatus for heating glass in sheet form comprising means to support a sheet of glass on a lower edge and to conduct it forwardly in its own plane, heating means disposed at both sides of the sheet in spaced relation thereto and adapted to direct heat toward the sheet, and a plurality of metal boxes interposed between the heating means on each side and the path of movement of said sheet and formed with perforations substantially throughout the surfaces of the boxes facing the sheet for release of gas toward the path of the sheet, said boxes extending from near the lower edge to near the upper edge of the sheet and each box of each plurality being spaced from each of the other boxes thereof, and means to introduce gas under pressure to the upper ends of said boxes.

6. Apparatus for heating glass in sheet form comprising in combination a loading section, a tunnel, a heating section within the tunnel, and a take-off section, conveying means near the base level of the tunnel and extending through the tunnel, means for mechanically supporting the sheets in a predetermined relation to the conveying means at the loading and take-off sections, heaters carried by each side wall of the tunnel in the heating section, said heaters extending from the base level upwardly to give radiant heat to the sheets as they pass through the heating section, narrow boxes extending generally in the direction of the height dimension of the glass and arranged in spaced relation to each other and along the path of the sheets and nearer to them than said heaters, and means for supplying gas under pressure into the upper ends of the boxes, the faces of the boxes juxtaposed to said path being adapted to supply heated gas towards the glass to support the glass in the predetermined relation with the conveying means.

References Cited

UNITED STATES PATENTS 3,062,520  11/1962  Frey et al. _____ 65—182 X
3,223,506  12/1965  Wheeler _____ 65—114

DONALL H. SYLVESTER, *Primary Examiner.*

A. D. KELLOGG, *Assistant Examiner.*